United States Patent
Arnabat Benedicto et al.

(10) Patent No.: US 9,692,943 B2
(45) Date of Patent: Jun. 27, 2017

(54) METHOD OF PREPARING THE RENDERING WITH A COLOR OUTPUT DEVICE OF AT LEAST ONE OBJECT

(71) Applicant: Hewlett-Packard Development Company, L.P., Houston, TX (US)

(72) Inventors: Jordi Arnabat Benedicto, L'Arboc del Penedes (ES); Marti Maria Saguer, Palamos (ES); Laura Alicia Clemente Gomez, Sant Cugat del Valles (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 23 days.

(21) Appl. No.: 14/763,506

(22) PCT Filed: Jan. 29, 2013

(86) PCT No.: PCT/EP2013/051710
§ 371 (c)(1),
(2) Date: Jul. 25, 2015

(87) PCT Pub. No.: WO2014/117824
PCT Pub. Date: Aug. 7, 2014

(65) Prior Publication Data
US 2016/0105589 A1    Apr. 14, 2016

(51) Int. Cl.
*H04N 1/60* (2006.01)
*G06K 15/02* (2006.01)

(52) U.S. Cl.
CPC ....... *H04N 1/6019* (2013.01); *G06K 15/1878* (2013.01); *H04N 1/6058* (2013.01)

(58) Field of Classification Search
CPC . H04N 1/6019; H04N 1/6058; G06K 15/1878
(Continued)

(56) References Cited

U.S. PATENT DOCUMENTS 5,717,507 A    2/1998  Vondran, Jr.
7,574,335 B1 *  8/2009  Estrada ............... G09G 3/2003
                                              358/518
(Continued)

FOREIGN PATENT DOCUMENTS

EP    1439691    7/2004
JP    2007-517480    6/2007

OTHER PUBLICATIONS

Caluori, Ursina, et al. "An RGB color management concept based on an improved gamut mapping algorithm." In IS&T/SPIE Electronic Imaging, pp. 724118-724118. International Society for Optics and Photonics, 2009.
(Continued)

*Primary Examiner* — Quang N Vo
(74) *Attorney, Agent, or Firm* — HP Inc.—Patent Department

(57) ABSTRACT

A method of preparing the rendering with a color output device of at least one object, the method comprising —computing a first output color profile of a first color model, said profile mimicking, for the human eye, a second output color profile of a second color model, said first output color profile being used in a description of said at least one object in a page description language, and the second output color profile being the output device profile, —and converting colors of pixels of the representation of the at least one object obtained by application of a rendering engine to said description, from the first output color profile to the second output color profile.

20 Claims, 6 Drawing Sheets

(58) Field of Classification Search
USPC .......................... 358/1.9, 518, 519, 520, 521
See application file for complete search history.

(56) References Cited

U.S. PATENT DOCUMENTS

| | | | |
|---|---|---|---|
| 7,859,722 B1* | 12/2010 | Kulkarni | H04N 1/60 |
| | | | 358/1.9 |
| 7,965,301 B1 | 6/2011 | Intwala | |
| 8,264,701 B2 | 9/2012 | Stevens | |
| 2005/0219577 A1* | 10/2005 | Edge | G06K 15/02 |
| | | | 358/1.9 |
| 2005/0243341 A1* | 11/2005 | Ng | H04N 1/54 |
| | | | 358/1.9 |
| 2006/0290961 A1 | 12/2006 | Low et al. | |
| 2009/0168082 A1 | 7/2009 | Aschenbrenner et al. | |
| 2010/0202003 A1* | 8/2010 | Parkhurst | G06F 3/1208 |
| | | | 358/1.9 |
| 2012/0105927 A1 | 5/2012 | Mestha et al. | |
| 2012/0258700 A1 | 10/2012 | Chang et al. | |
| 2012/0307264 A1* | 12/2012 | Arregui | H04N 1/6002 |
| | | | 358/1.9 |

OTHER PUBLICATIONS

International Search Report, European Patent Office, Oct. 14, 2013, PCT Patent Application No. PCT/EP2013/051710. 3 pages.

* cited by examiner

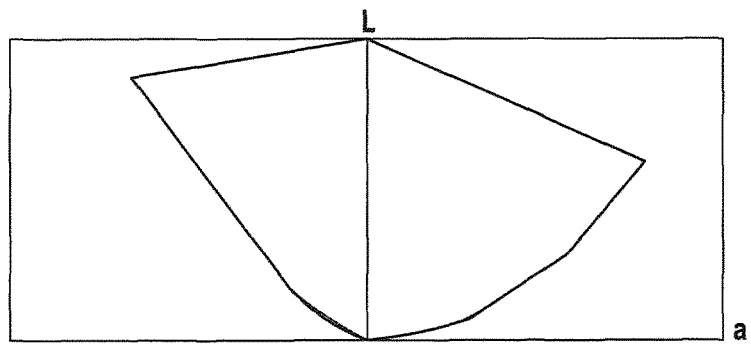
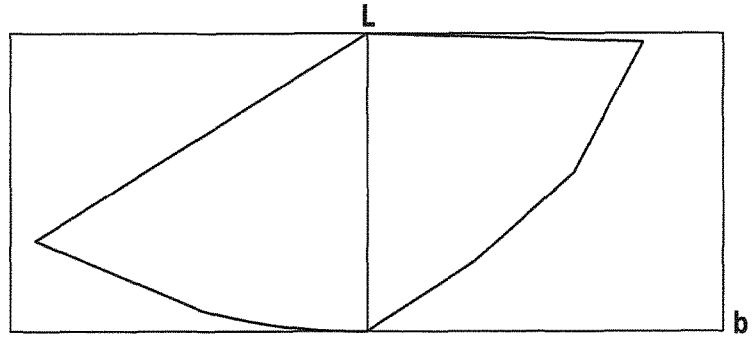
FIG.6
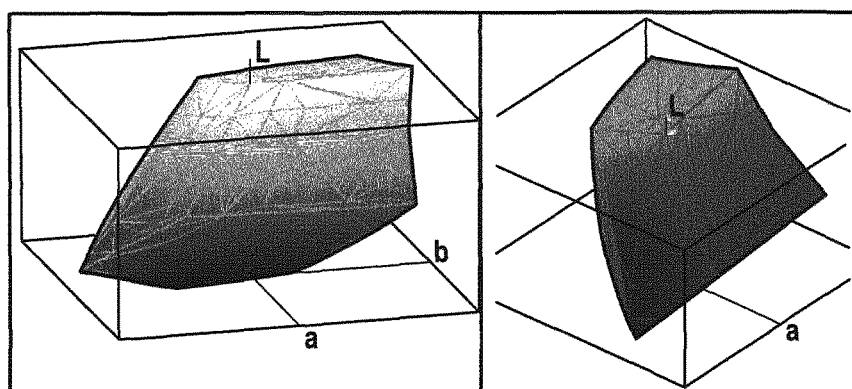
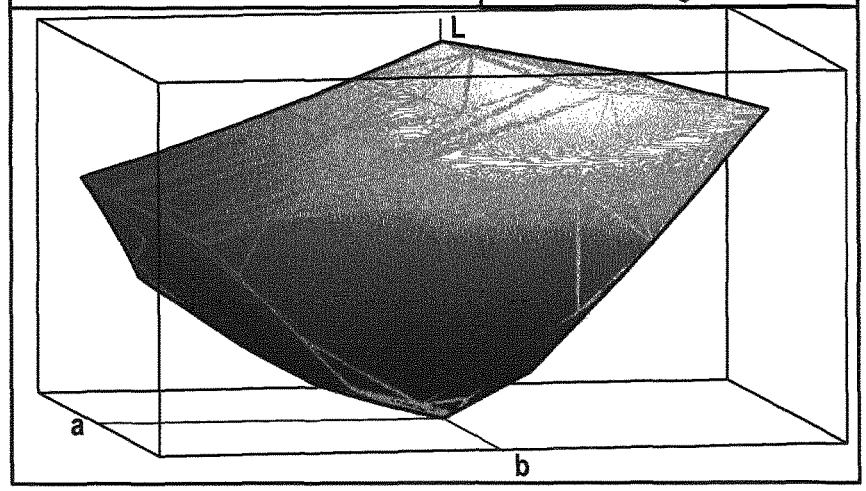
FIG.7

METHOD OF PREPARING THE RENDERING WITH A COLOR OUTPUT DEVICE OF AT LEAST ONE OBJECT

CROSS-REFERENCE TO RELATED APPLICATION

This application is a U.S. National Stage Application of and claims priority to International Patent Application No. PCT/EP2013/051710, filed on Jan. 29, 2013, and entitled "A METHOD OF PREPARING THE RENDERING WITH A COLOR OUTPUT DEVICE OF AT LEAST ONE OBJECT," which is hereby incorporated by reference in its entirety.

BACKGROUND

The present disclosure relates to the preparation of the rendering with a color output device of an object or several objects described in a page description language.

Portable Document Format (also known as PDF) is a file format used to describe documents with a page description language. It is more and more adopted in the graphics and printing industry as a data interchange format. A PDF file encapsulates a complete description of a fixed-layout flat document, including text, images and some information to render it. A rendering engine is used to read the description and convert it to pixels forming an image that can be output on an output device that can be a display device, a printer device or another kind of output device.

The PDF format support many features, including colors, overprinting objects and transparencies.

Colors are often defined in the PDF documents in the CMYK color model that is a subtractive color model referring to the four inks used: cyan, magenta, yellow, and black. The CMYK model is widely used in the offset printing industry (and in printing systems in general), and this has had a large role on the widespread usage of the CMYK color model in PDF files.

The CMYK model used in the description of PDF files is either untagged, leaving undefined the parameters defining the precise color profile to use, which will be the one of the output device, or tagged, which means that parameters defining a precise color profile used to describe the document are specified in the document.

Overprinting objects is obtained by blending the objects to generate the pixels to print, whereas transparency is a further feature that allows objects to interact with each other to produce blending effects. A color blending operation is defined, inter alia, by a blend color space that is used to compute the color of pixels resulting from the blending of the objects. The blend color space is usually a CMYK color space, because the CMYK model is well adapted to perform blending.

The output device may however not operate in a CMYK space. For example, many printers and visual display screens use the RGB color model. The RGB acronym refers to Red, Green and Blue and this model is an additive color model. Like CMYK, RGB is a device dependent model.

The final ink space is not necessarily RGB, but in that case, RGB is used as an intermediate space. There are printers operating with 6, 7-8 inks or even with 12 inks. In such cases, and in order to hide the complexity of multilink separations, RGB is a suitable pick as device color model.

When the objects are defined in a CMYK color space in the description language or when a CMYK blending space is used, a conversion from the CMYK space to the RGB space has to be applied. Known conversions include calibrated and uncalibrated conversions.

Many features and advantages of the above-described method will become readily apparent from the following detailed description and accompanying drawings.

BRIEF DESCRIPTION OF THE DRAWINGS

FIGS. 5 and 6 are other exemplary illustrations of another example.

FIG. 7 is another exemplary illustration of another particular example.

DETAILED DESCRIPTION OF EXAMPLES

Figure 1:
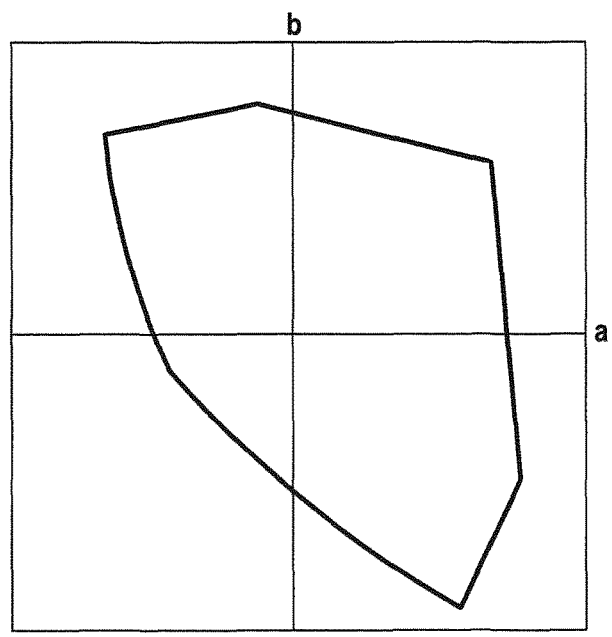
FIG. 1 is a plot of a profile of a printer, according to one example.
Figure 2:
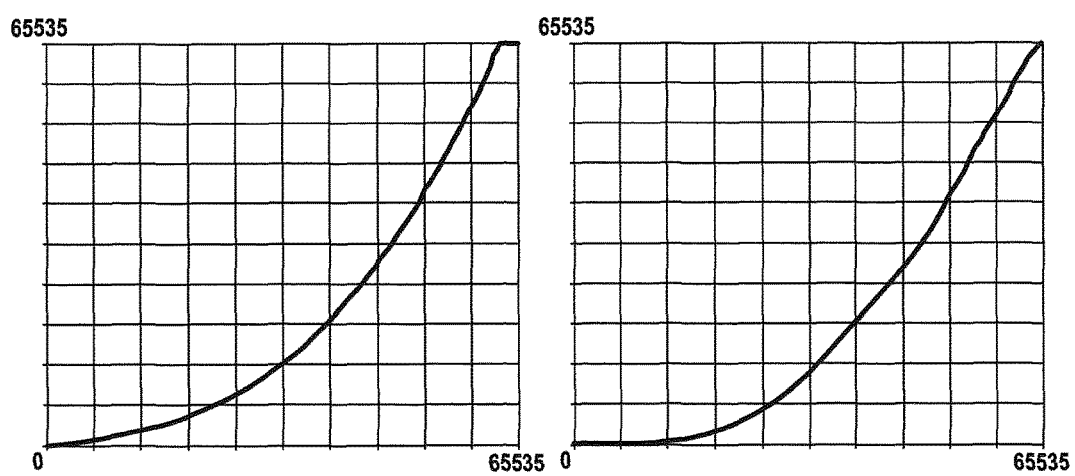
FIG. 2 shows examples of gamma curves measured in profiles of printers, such as the one of FIG. 1.

In FIG. 1, the a*/b* chromaticity plot of an RGB profile of a printer is shown. In FIG. 2, two examples of the gamma transfer functions measured in RBG profiles of two different printers are shown. Most RGB spaces are perceptually uniform, which means that they have a transfer function adapted to the response of human eyes. Human eyes have a response to external stimuli that is described as a logarithmic response.

The PDF files specify the objects in CMYK color model, and, sometimes, a precise color profile is not even given, that means the CMYK space is an untagged space. When blending has to be performed, a blending color space has to be used, and, as the objects are defined in CMYK, the blending space is CMYK. There is then the need to convert the CMYK pixels to the printer or display RGB color pixels. The inventors found that this results in gamut clipping, since the gamut of CMYK spaces is different from the gamut of printer device RGB space, and this results also in color output clipping.

Figure 3:
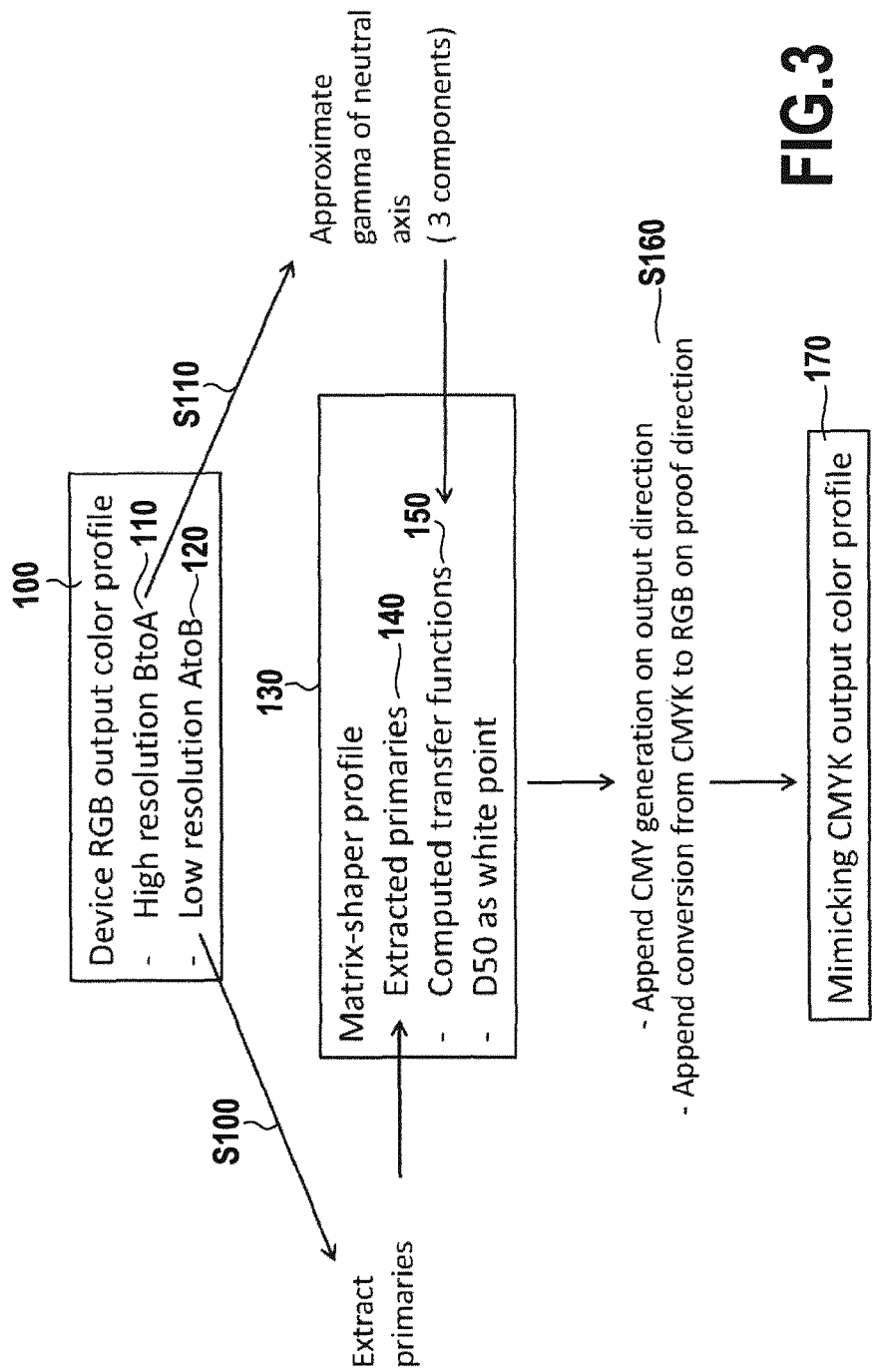
FIG. 3 is a flow diagram of a method according to an example.

In FIG. 3, an example of a method according to the disclosure is presented. It creates a CMYK output color profile on the basis of a device RGB output color profile 100, such as those that are illustrated on FIGS. 1 and 2.

The device RGB output profile 100 includes high resolution BtoA tables 110 for re-rendering and low resolution AtoB tables 120 for soft proofing. The method includes a step S100 of extracting primaries 140 out of the low resolution AtoB tables 120. This is done by obtaining XYZ values of RBG primaries by evaluating (255, 0, 0), (0, 255, 0) and (0, 0, 255) across AtoB table.

The method further includes a step S110 of approximating the gamma factor of the neutral axis of the RGB output profile. This is done by evaluating a linear ramp of 256 scaled D50 XYZ values across the high resolution BtoA tables 110. The obtained results are fitted in a power function, of the form $f(x)=x^\gamma$. The value of the gamma exponent is usually taken between 2.1 and 2.5, and preferably between 2.2 and 2.4. Three tables, one per color component are obtained. These tables are used as transfer function 150.

A matrix-shaper profile 130 is created with the extracted primaries and the computed transfer function. D50 is used as the white point.

A further step S160 of concatenation is performed. CMY generation is appended on the output direction of the matrix-shaper profile 130, and a conversion from CMYK to RGB is appended on the proof direction. Virtual CMYK algorithm with Wk=Wg=1 is used in an example to append the conversion on the proof direction. The CMY generation on the output direction is performed with no black: C=1−R, M=1−G, Y=1−B and K=0. A computed CMYK output profile 170 is obtained, that mimics the device RGB profile.

The computed output profile 170 is highly advantageous when used as an intermediate color space for rendering objects described in a PDF file in CMYK model with a RGB printer or RGB display. Indeed, it has a gamut that is similar to the gamut of the RGB space, and thus a conversion through this space does not limit the total gamut. The final colors, when the images are processed through the intermediate space to the final RGB space are perfectly rendered as intended in the document description. The colors outside the printer gamut do not change their hue. There is no faded colors not color shifts. The primaries are preserved, and there is no contouring artifact.

In particular, these results are better than when a standard CMYK space is used instead of the computed CMYK profile 170. For example, if SWOP (Specifications for Web Offset Publications) or ECI (European Color Initiative) spaces are used, there is some gamut clipping, and the colors are faded and washed out, blocking and contouring artifacts do show and black and colorant purity are compromised.

The clipping effect shows because the gamut of a RGB space (for example sRGB or standard RGB) does not encompass the gamut of SWOP completely (as is visible on a CIE L*a*b* color space plot), i.e. there are some colors that are inside the gamut of SWOP but not inside the gamut of a RGB space such as sRGB.

Note further that there is abundant specialized literature on how to measure printing artifacts. And, on the question of colorant purity, the problem of "scum dot", where small, dispersed dots of unwanted inks appear in zones that should be printed using just one pure ink, is known. This problem is very evident in yellow-only zones.

With the computed color profile 170, these drawbacks and limitations are overcome.

Figure 4:
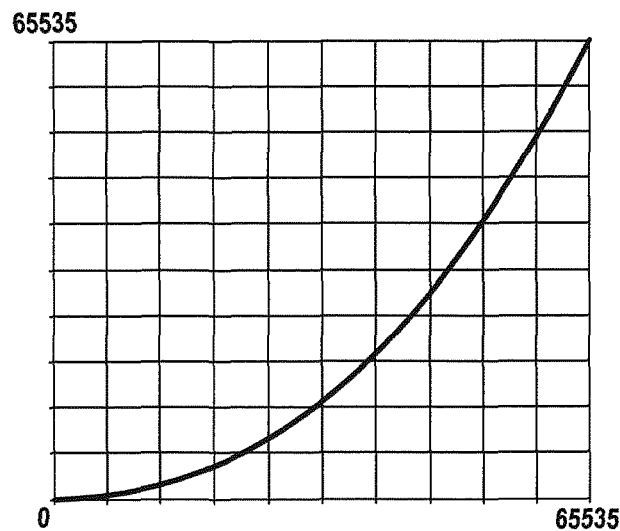
FIG. 4 is a exemplary illustration of one particular aspect of an example.

On FIG. 4, the simulation of a gamma curve, as obtained in step S110, is shown. It is based on the fitting of the extracted values into a pure exponential function using a power of 2.2.

Figure 5:
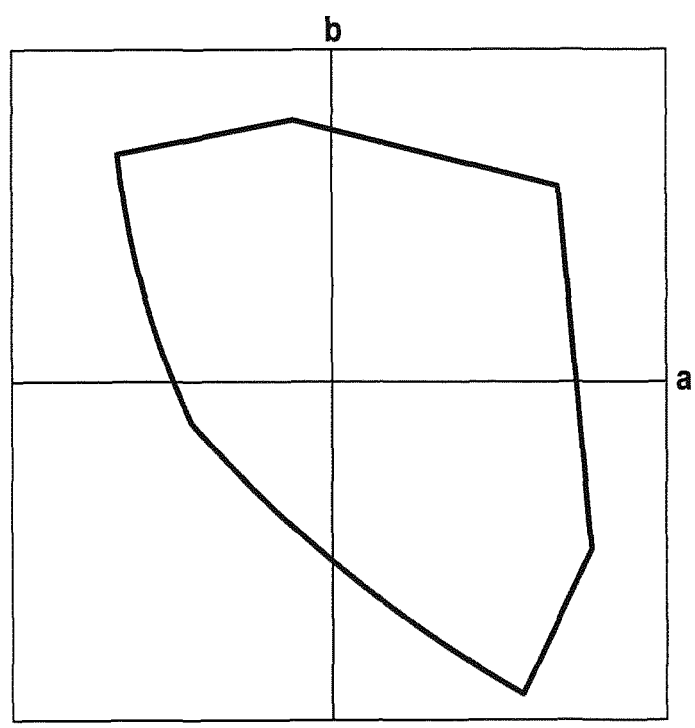

On FIG. 5, the a*/b* chromaticity plot of the CMYK profile obtained on the basis of the RGB profile of FIG. 1 is shown. By comparing the plots of FIGS. 1 and 5, it is apparent that the profiles are highly similar, that shows that the method manages to mimic the RGB printer space in a very precise manner.

On FIG. 6, the L*/a* plots (upper plot) and L*/b* (lower plot) of the original RGB profile (same as on FIG. 1) and the obtained CMYK profile (same as on FIG. 5) are shown. Again, the curves are substantially the same. There is a small deviation in the a*-axis, but this is only due to round-off errors in the software.

On FIG. 7, 3-dimensional representations of the gamut of the original RGB profile (in color) and the obtained CMYK profile (lines in orange) are shown. It is remarkable that the primaries and the white and black points are located in same places in both profiles and that the solid volumes are equal for both profiles.

Figure 8:
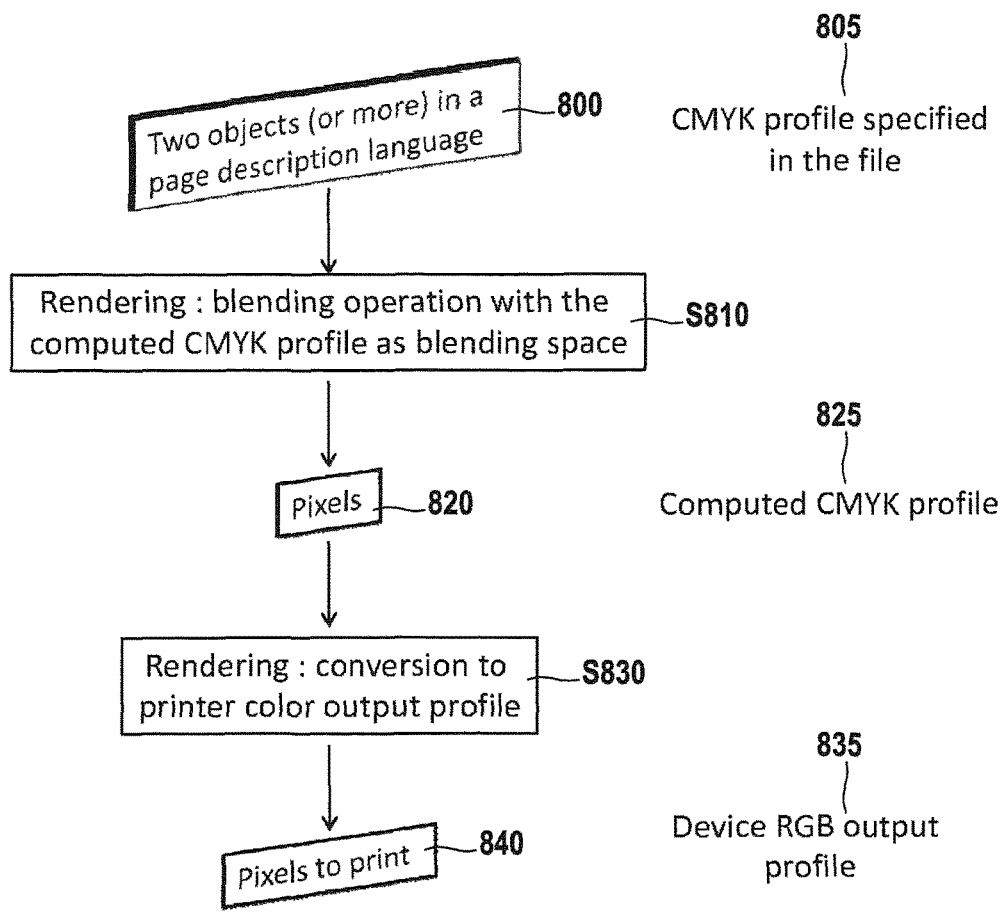
FIG. 8 is a flow diagram illustrating one aspect of the disclosure.

On FIG. 8, a first example is shown. A PDF document is prepared for rendering by an RGB printer. The PDF document describes two (or more) objects 800 that need to be blended together. The PDF document describes these objects using a CMYK profile 805 that can be described in the PDF file (as shown on the figure), or that can be non-specified CMYK (untagged CMYK—not shown). There follows a step S810 of blending the objects in the CMYK profile computed according to the disclosure (see FIG. 3). This step is performed by the rendering engine. This leads to the generation of pixels defined in the computed CMYK profile 825. The rendering engine then converts, in a step of conversion S830 these pixels to pixels to print 840 in the printer RGB color output profile 835. The printer can then proceed and print the image with the inks actually present in the device.

Figure 9:
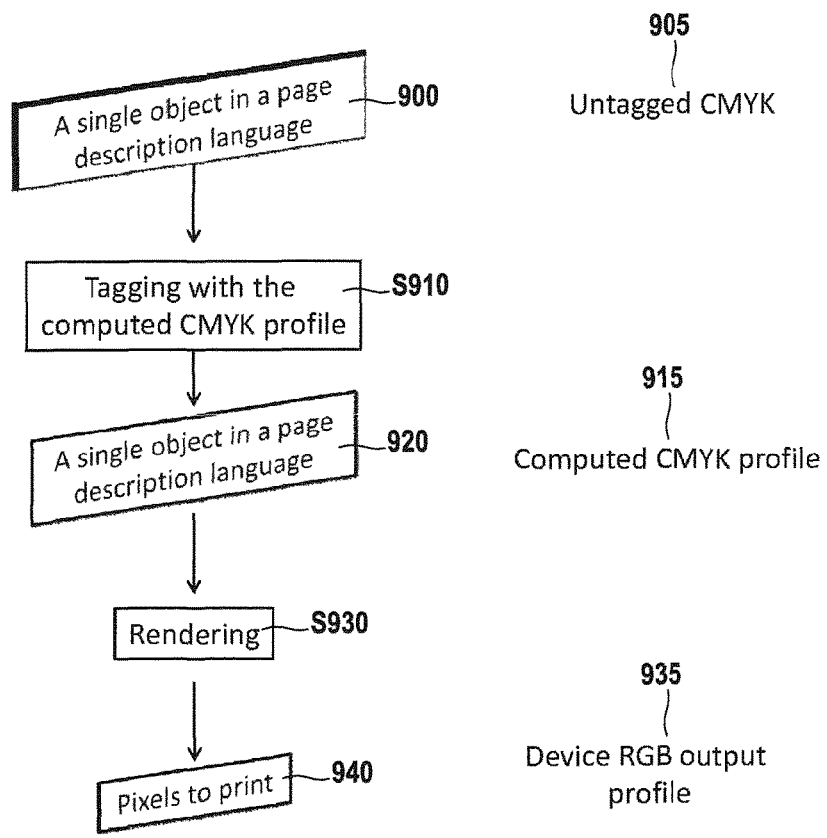
FIG. 9 is a flow diagram illustrating another aspect of the disclosure.

On FIG. 9, a second example is shown. A PDF document is again prepared for rendering by an RGB printer. The PDF document describes one (or more) objects 900. The PDF document describes these objects using a CMYK profile 905 that is non-specified CMYK (untagged CMYK). There follows a step S910 of tagging the object(s) in the CMYK computed profile (see FIG. 3). This leads to the obtaining of one or several objects 900 described in a page description language and defined in the computed CMYK profile 915. The rendering engine then converts, in a step of conversion S930 these objects 900 to pixels to print 940 in the printer RGB color output profile 935. The printer can then proceed and print the image.

Figure 10:
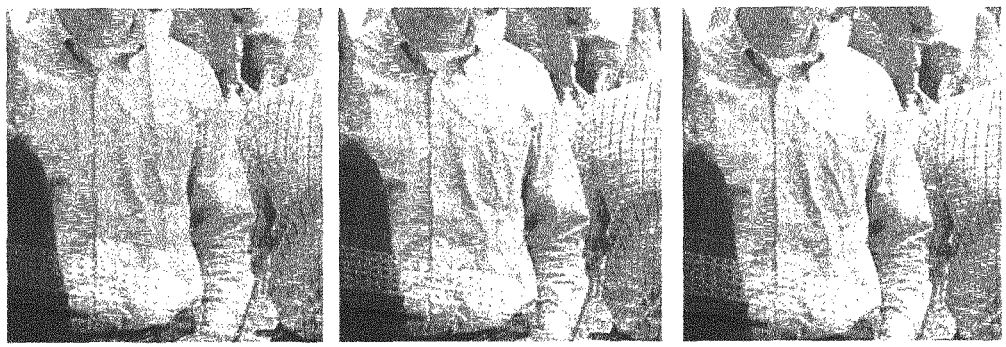
FIG. 10 is a comparative example of a resulting rendering obtained.

On FIG. 10, a comparative example of the obtained rendering is shown. It is based on a true PDF file example.

In the first (left) part of the figure, a picture processed according to the prior art is shown. The data has first been converted through standard CMYK (i.e. SWOP coated) profile and then converted again into standard RGB profile (i.e. sRGB) to show the result in the computer window.

In the second (middle) part of the figure, the data is first converted through the computed CMYK profile, and then converted into standard RGB profile (sRGB) to show the result in the computer window.

In the third (right) part of the figure, the data is only converted to the RGB color model to show results in the computer window.

It is apparent, when comparing the three images, that the middle image and the right image are close to each other for the human eye, whereas the left image has a gamut that is quite different from the gamut from the two other images. Indeed, the gamut of the left image has been clipped by the intermediate conversion to the standard CMYK profile, whereas the round-trip through the computed CMYK profile left the gamut of the middle image totally unchanged.

It will be appreciated that various of the above-disclosed features may be combined into different systems and applications. The examples are considered as illustrative and not limiting. Various changes may be made without departing from the spirit and scope of the disclosure.

The invention claimed is:

1. A method of preparing a rendering with a color output device of at least one object, the method comprising:
   computing, by a computer, a first output color profile of a first color model, the first output color profile mimicking, for a human eye, a second output color profile of a second color model, the first output color profile being used in a description of the at least one object in a page description language, and the second output color profile being an output device profile of the color output device, the first output color profile computed based on the second output color profile; and converting, by the computer, colors of pixels of a representation of the at least one object obtained by application of a rendering engine to the description that uses the first output color profile to describe the at least one object, the colors of the pixels of the representation obtained by the application of the rendering engine to the description being defined by the first output color profile, the converting comprising converting the colors of the pixels of the representation defined using the first output color profile to colors of pixels to output by the color output device using the second output color profile.

2. A method according to claim 1, wherein computing the first output color profile comprises preparing a matrix-shaper profile approximating the second output color profile.

3. A method according to claim 1, wherein computing the first output color profile comprises concatenating a color output profile representing the second output profile with a first color model generation on an output direction, and a second color model generation on a proof direction.

4. A method according to claim 1, wherein computing the first output color profile comprises performing a pure-exponential approximation of a gamma factor of an axis of the second output color profile.

5. A method according to claim 4, wherein performing the pure-exponential approximation comprises obtaining one table per component through evaluation of a linear ramp of scaled values across re-rendering tables of the second output color profile and fitting into a power function, the re-rendering tables being used as transfer functions for the first output color profile.

6. A method according to claim 1, wherein computing the first output color profile comprises extracting primaries from soft proofing tables of the second output color profile.

7. A method according to claim 1, further comprising blending at least two objects described with the first output color profile, by applying the rendering engine.

8. A method according to claim 7, wherein blending the at least two objects comprises blending for overprinting objects or blending for applying transparencies.

9. A method according to claim 1, further comprising tagging the at least one object with the first output color profile.

10. A method according to claim 1, wherein the first color model is a subtractive color model.

11. A method according to claim 1, wherein the second color model is an additive color model.

12. A method according to claim 1, wherein the color output device is a printer.

13. A method according to claim 1, wherein the page description language is a Portable Document Format (PDF) language.

14. A method according to claim 1, wherein the first output color profile is a CMYK output color profile, and the second output color profile is an RGB output color profile.

15. A system comprising:
a processor; and
a non-transitory computer readable medium storing instructions executable on the processor to:
compute a first output color profile of a first color model based on a second output color profile for a color output device, the first output color profile mimicking, for a human eye, the second output color profile of a second color model, the first output color profile being used in a description of at least one object in a page description language; and
convert colors of pixels of a representation of the at least one object obtained by application of a rendering engine to the description that uses the first output color profile to describe the at least one object, the colors of the pixels of the representation obtained by the application of the rendering engine to the description being defined by the first output color profile, the converting comprising converting the colors of the pixels of the representation defined using the first output color profile to colors of pixels to output by the color output device using the second output color profile.

16. A system according to claim 15, wherein the first output color profile a CMYK output color profile, and the second output color profile is an RGB output color profile.

17. A system according to claim 15, wherein the application of the rendering engine blends plural objects using the first output color profile as an intermediate color space to produce the pixels of the representation.

18. A system according to claim 15, comprising a printer to print an image comprising the colors of the pixels according to the second output color profile.

19. A non-transitory computer readable medium comprising a computer program, the computer program including instructions for preparing rendering with a color output device of at least one object, the instructions including instructions to:
compute a first output color profile of a first color model based on a output color profile for the color output device, the first output color profile mimicking the second output color profile of a second color model, the first output color profile being used in a description of the at least one object in a page description language; and
convert colors of pixels of a representation of the at least one object obtained by application of a rendering engine to the description that uses the first output color profile to describe the at least one object, the colors of the pixels of the representation obtained by the application of the rendering engine to the description being defined by the first output color profile, the converting comprising converting the colors of the pixels of the representation defined using the first output color profile to colors of pixels to output by the color output device using the second output color profile.

20. A non-transitory computer readable medium according to claim 19, wherein the application of the rendering engine uses the first output color profile as an intermediate color space.

* * * * *